United States Patent
Stoevring

(10) Patent No.: US 10,218,217 B2
(45) Date of Patent: Feb. 26, 2019

(54) UPS FOR MIXED AC AND DC LOADS

(71) Applicant: SCHNEIDER ELECTRIC IT CORPORATION, West Kingston, RI (US)

(72) Inventor: Morten Stoevring, Kolding (DK)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 289 days.

(21) Appl. No.: 15/025,640

(22) PCT Filed: Sep. 30, 2013

(86) PCT No.: PCT/US2013/062623
§ 371 (c)(1),
(2) Date: Mar. 29, 2016

(87) PCT Pub. No.: WO2015/047393
PCT Pub. Date: Apr. 2, 2015

(65) Prior Publication Data
US 2016/0241082 A1    Aug. 18, 2016

(51) Int. Cl.
*H02J 7/00* (2006.01)
*H02J 9/00* (2006.01)
(Continued)

(52) U.S. Cl.
CPC .............. *H02J 9/062* (2013.01); *H02M 7/44* (2013.01); *H02J 2009/068* (2013.01)

(58) Field of Classification Search
CPC ....... H02J 9/062; H02J 2009/068; H02M 7/44
(Continued)

(56) References Cited

U.S. PATENT DOCUMENTS 4,709,318 A    11/1987    Gephart et al.
4,719,550 A    1/1988    Powell et al.
(Continued)

FOREIGN PATENT DOCUMENTS

CN    101842961 A    9/2010
EP    0410716 B1    9/1994
WO    20130130054 A1    9/2013

OTHER PUBLICATIONS

Notification of Transmittal of the International Search Report and the Written Opinion of the International Searching Authority from corresponding PCT/US2013/062623 dated Feb. 28, 2014.
(Continued)

*Primary Examiner* — Richard Tan
(74) *Attorney, Agent, or Firm* — Lando & Anastasi, LLP

(57) ABSTRACT

According to one aspect, embodiments of the invention provide a UPS comprising an input to receive input AC power, a bus configured to receive backup DC power, a first output configured to provide an output AC voltage derived from at least one of the input AC power and the backup DC power, a second output configured to provide an output DC voltage derived from at least one of the input AC power and the backup DC power, a first inverter coupled between the bus and a first transformer, the first transformer coupled to the input, a second inverter coupled between the bus and a second transformer, the second transformer coupled to the first output, and a controller configured to operate the second inverter to maintain the output AC voltage above a first threshold value and to operate the first inverter to maintain the output DC voltage above a second threshold.

18 Claims, 3 Drawing Sheets

(51) Int. Cl.
  *H02J 9/06* (2006.01)
  *H02M 7/44* (2006.01)
(58) Field of Classification Search
  USPC .......................................................... 307/66
  See application file for complete search history.

(56) References Cited

U.S. PATENT DOCUMENTS

| | | | |
|---|---|---|---|
| 5,347,164 | A | 9/1994 | Yeh |
| 5,781,422 | A | 7/1998 | Lavin et al. |
| 6,768,223 | B2 | 7/2004 | Powell et al. |
| 7,851,944 | B2 | 12/2010 | Li et al. |
| 7,888,907 | B2 | 2/2011 | Litovsky et al. |
| 2008/0224541 | A1* | 9/2008 | Fukuhara ............ H02J 3/32 307/48 |
| 2011/0298283 | A1* | 12/2011 | Sannino ............ B63J 3/04 307/38 |
| 2011/0305049 | A1 | 12/2011 | Raptis et al. |
| 2012/0267952 | A1* | 10/2012 | Ballatine ............ H02J 1/102 307/26 |
| 2016/0065056 | A1 | 3/2016 | Chen |

OTHER PUBLICATIONS

"Understanding Delta Conversion Online Power Regulation—Part 2", Internet Citation, Dec. 31, 2004 (Dec. 31, 2004 ), pp. 1-5, XP0027 44340, Retrieved from the Internet: URL:http://www.apcmedia.com/salestools/TDOY-5UQVD9/TDOY-5UQVD9_R1_EN.pdf?sdirect=true [retrieved on Sep. 10, 2015].
"Understanding Delta Conversion Online(TM) "The Difference"—Part 1", American Power Conversion, Jan. 1, 2004 (Jan. 1, 2004 ), pp. 1-8, XP055161078.
Extended European Search Report from corresponding European Application No. 13894445.9 dated May 11, 2017.

\* cited by examiner

UPS FOR MIXED AC AND DC LOADS

CROSS-REFERENCE TO RELATED APPLICATIONS

This application is a U.S. National Stage Application under 35 U.S.C. § 371 of International Application No. PCT/US2013/062623, filed Sep. 30, 2013, titled UPS FOR MIXED AC AND DC LOADS, which is hereby incorporated herein by reference in its entirety.

BACKGROUND OF INVENTION

Field of the Invention

At least one example in accordance with the present invention relates generally to uninterruptible power supplies (UPS).

Discussion of Related Art

Electrical appliances (e.g., office or home equipment, measuring instruments, medical devices, datacenter equipment such as routers and servers, etc.) may be configured to receive and operate on AC or DC power from an AC or DC source. Such electrical appliances are commonly coupled to an AC or DC power outlet that provides AC or DC power to the appliance from an AC or DC source. The power outlet may be one of a plurality of power outlets of a power distribution unit (e.g., a power strip). The AC or DC power received by an appliance from a power outlet may be provided directly to the appliance from the outlet or may first be conditioned via an Uninterruptible Power Supply (UPS) coupled between the power outlet and the appliance.

The use of a power device, such as a UPS, to provide regulated, uninterrupted power for sensitive and/or critical loads, such as computer systems, datacenter equipment, and other data processing systems, is known. In general, a UPS includes, or is connected to, both a primary source of power and an alternate source of power where the alternate source of power can be employed to supply power to the electrical load when the primary source is not available (i.e., in a backup mode of operation). Often, the primary source of power is an AC power source such as power supplied from an electric utility. The alternate source of power generally includes one or more batteries supplying DC power which is converted by the UPS into AC power and provided to the electrical load during the backup mode of operation. The batteries are generally recharged by a battery charger coupled to the UPS that receives power provided to the UPS by the primary source of power.

SUMMARY OF THE INVENTION

Aspects in accord with the present invention are directed to an Uninterruptible Power Supply (UPS) comprising an input configured to be coupled to an AC source and to receive input AC power from the AC source, a DC bus configured to be coupled to a DC source and to receive backup DC power from the DC source, a first output configured to be coupled to at least one AC load and to provide output AC power having an output AC voltage to the at least one AC load derived from at least one of the input AC power and the backup DC power, a second output configured to be coupled to at least one DC load and to provide output DC power having an output DC voltage to the at least one DC load derived from at least one of the input AC power and the backup DC power, a first inverter coupled between the DC bus and a first transformer, the first transformer coupled to the input, a second inverter coupled between the DC bus and a second transformer, the second transformer coupled to the first output, and a controller configured to operate the second inverter to maintain the output AC voltage above a first threshold value and to operate the first inverter to maintain the output DC voltage above a second threshold.

According to one embodiment, a primary winding of the first transformer is coupled between the input and the first output, and a secondary winding of the first transformer is coupled to the first inverter. In one embodiment, the controller is further configured to monitor a voltage level of the DC bus and, based on the voltage level of the DC bus, to operate the first inverter to adjust the input AC power by regulating current in the secondary winding of the first transformer.

According to another embodiment, the controller is further configured to determine whether the voltage level of the DC bus is at a desired float level, and in response to a determination that the voltage level of the DC bus is less than the desired float level, to operate the first inverter to increase the input AC power, convert at least a portion of the increased input AC power, from the first transformer, into DC power, and provide the converted DC power from the first inverter to the DC bus. In one embodiment, the controller is further configured to operate the second inverter to convert at least a portion of the increased input AC power, from the second transformer, into DC power and provide the converted DC power from the second inverter to the DC bus. In another embodiment, the controller is further configured, in response to a determination that the voltage level of the DC bus is greater than the desired float level, to operate the first inverter to decrease the input AC power, convert DC power from the DC bus into AC power, and provide the converted AC power from the first inverter to the input via the first transformer.

According to one embodiment, the UPS further comprises a DC source and wherein the DC source includes a plurality of batteries coupled in series and configured to provide a positive voltage to the DC bus. In another embodiment, the UPS further comprises a DC source and wherein the DC source includes a plurality of batteries coupled in series and configured to provide a negative voltage to the DC bus. In another embodiment, the UPS further comprises a DC source and wherein the DC source includes a plurality of batteries coupled in series and wherein the DC bus is coupled to a negative terminal of a first one of the plurality of batteries and a positive terminal of a second one of the plurality of batteries.

According to another embodiment, a primary winding of the second transformer is coupled between the first output and ground, and a secondary winding of the second transformer is coupled to the second inverter. In one embodiment, the controller is further configured to monitor the output AC voltage and, in response to a determination that the output AC voltage is less than the first threshold value, to operate the second inverter to convert DC power from the DC bus into AC power and provide the converted AC power from the second inverter to the first output via the second transformer. In another embodiment, the controller is further configured, in response to a determination that the output AC voltage is greater than the first threshold value, to operate the second inverter to convert a portion of the output AC power, from the second transformer, into DC power and provide the converted DC power from the second inverter to the DC bus.

Another aspect in accord with the present invention is directed to a method for operating a UPS having an input to receive input AC power, a DC bus configured to receive backup DC power, a first output configured to be coupled to at least one AC load and to provide output AC power having an output AC voltage to the at least one AC load derived from at least one of the input AC power and the backup DC power, a second output configured to be coupled to at least one DC load and to provide output DC power having an output DC voltage to the at least one DC load derived from at least one of the input AC power and the backup DC power, wherein the method comprises monitoring, with a controller, the output DC voltage provided to the at least one DC load, monitoring, with the controller, the output AC voltage provided to the at least one AC load, operating a first inverter coupled between the DC bus and the input to maintain the output DC voltage provided to the at least one DC load above a first threshold, and operating a second inverter coupled between the DC bus and the first output to maintain the output AC voltage provided to the at least one AC load above a second threshold.

According to one embodiment, the first inverter is coupled to the input via a first transformer, the first transformer having a primary winding coupled between the input and the first output and a secondary winding coupled to the first inverter, monitoring the output DC voltage includes monitoring a DC voltage level of the DC bus, and operating the first inverter includes operating, based on the DC voltage level of the DC bus, the first inverter to adjust the input AC power by regulating current in the secondary winding of the first transformer.

According to another embodiment, operating the first inverter to adjust the input AC power includes determining whether the DC voltage level of the DC bus is less than a desired float level, in response to a determination that the DC voltage level of the DC bus is less than the desired float level, operating the first inverter to increase the input AC power, converting at least a portion of the increased input AC power, from the first transformer, into DC power, and providing the converted DC power from the first inverter to the DC bus.

According to one embodiment, the method further comprises operating the second inverter to convert at least a portion of the increased input AC power, from the second transformer, into DC power, and providing the converted DC power from the second inverter to the DC bus. In one embodiment, operating the first inverter to adjust the input AC power further includes, in response to a determination that the DC voltage level of the DC bus is greater than the desired float level, operating the first inverter to decrease the input AC power, converting DC power from the DC bus into AC power, and providing the converted AC power from the first inverter to the input via the first transformer.

According to another embodiment, the second inverter is coupled to the first output via a second transformer, the second transformer having a primary winding coupled between the first output and ground and a secondary winding coupled to the second inverter, and operating the second inverter includes, in response to a determination that the output AC voltage is less than the second threshold, operating the second inverter to convert DC power from the DC bus into AC power, and providing the converted AC power from the second inverter to the first output via the second transformer. In one embodiment, operating the second inverter further includes, in response to a determination that the output AC voltage is greater than the second threshold, operating the second inverter to convert a portion of the output AC power, from the second transformer, into DC power, and providing the converted DC power from the second inverter to the DC bus.

One aspect of in accord with the present invention is directed to an Uninterruptible Power Supply (UPS) comprising an input configured to be coupled to an AC source and to receive input AC power from the AC source, a DC bus configured to be coupled to a DC source and to receive backup DC power from the DC source, a first output configured to be coupled to at least one AC load and to provide output AC power having an output AC voltage to the at least one AC load derived from at least one of the input AC power and the backup DC power, a second output configured to be coupled to at least one DC load and to provide output DC power having output DC voltage to the at least one DC load derived from at least one of the input AC power and the backup DC power, means for providing galvanic isolation between the first output and the second output, and means for maintaining the output AC voltage above a first threshold and for maintaining the output DC voltage above a second threshold.

BRIEF DESCRIPTION OF DRAWINGS

The accompanying drawings are not intended to be drawn to scale. In the drawings, each identical or nearly identical component that is illustrated in various FIGs. is represented by a like numeral. For purposes of clarity, not every component may be labeled in every drawing. In the drawings.

DETAILED DESCRIPTION

Figure 1:
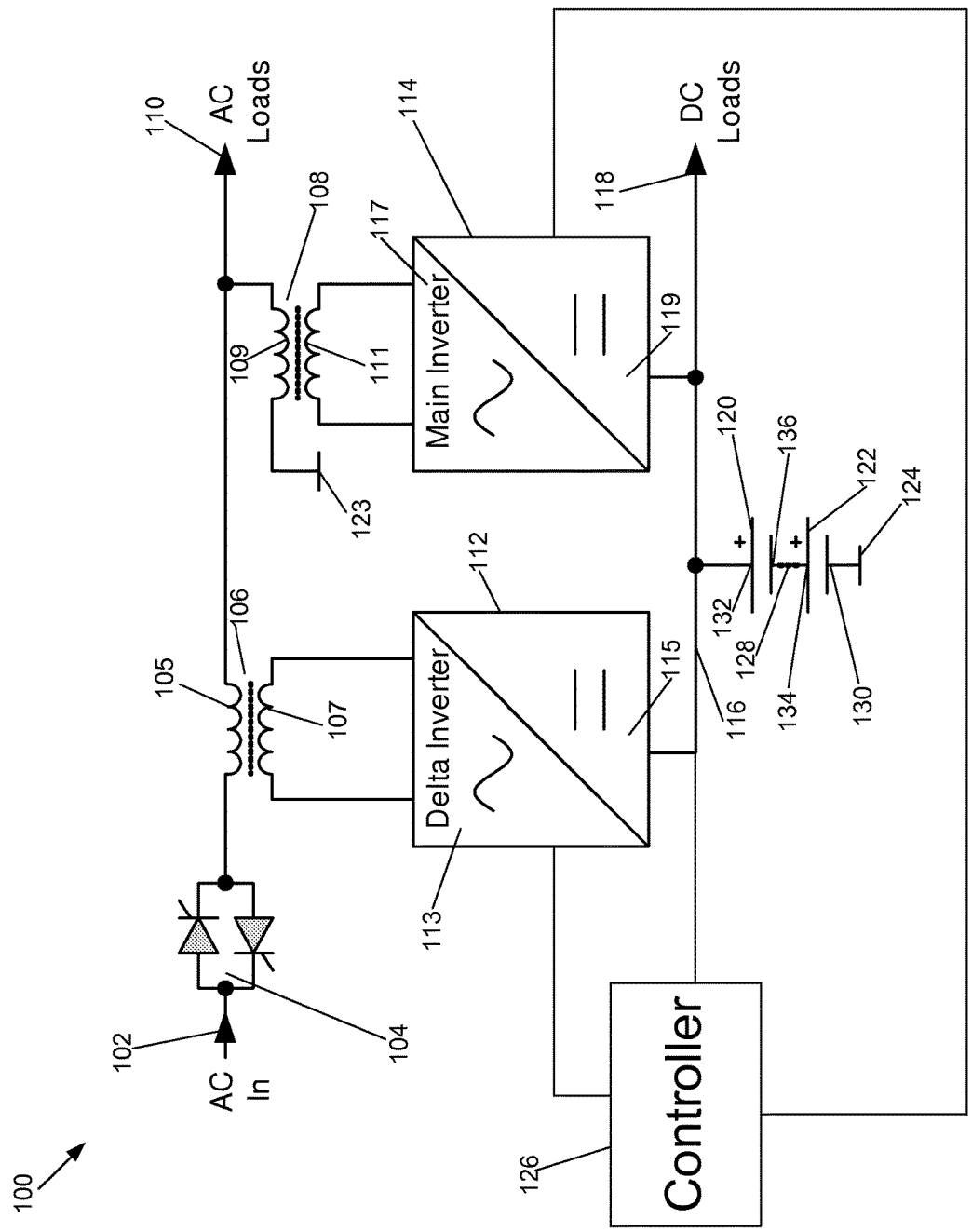
FIG. 1 is a circuit diagram of an uninterruptible power supply in accordance with aspects of the present invention.

Embodiments of the invention are not limited to the details of construction and the arrangement of components set forth in the following description or illustrated in the drawings. Embodiments of the invention are capable of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

As discussed above, electrical appliances may be configured to receive and operate on AC or DC power from an AC or DC source. Some systems or installations may include both AC powered and DC powered appliances. For example, datacenters typically include mixed-source electrical appliances, with some appliances operating on AC power and some appliances operating on DC power. This may prove problematic where connection of both types of appliances (AC and DC) to a UPS system is desired.

A standard approach to accommodate both AC and DC powered appliances within a datacenter is to include separate UPS systems with respective AC and DC outputs within the datacenter. However, this may lead to a large, complex and relatively expensive system to install and maintain. Additionally, the split between the number of AC powered loads and DC power loads within the datacenter may change over time, resulting in insufficient UPS support and/or stranded capacity within the datacenter. For example, if a datacenter with separate AC and DC UPS systems is initially designed to accommodate a fixed number of AC and DC powered loads, the future development or conversion of additional DC power loads within the datacenter (i.e., a higher deployment of DC loads in the datacenter) may result in the datacenter not having enough DC UPS systems to accommodate each DC powered load and the AC UPS systems having stranded capacity (i.e., unused capacity).

Accordingly, embodiments described herein provide a UPS with both AC and DC outputs that is capable of providing power to both AC and DC powered loads. By providing a single UPS with both AC and DC outputs, the complexity of UPS systems within a datacenter may be reduced and the single UPS may be adapted to meet different AC and DC load requirements of the datacenter. Additionally, according to some embodiments, the UPS described herein may be relatively efficient, able to provide isolation between AC and DC loads, and provide Power Factor Correction (PFC) functionality for both AC and DC loads.

FIG. 1 shows a UPS 100 according to aspects described herein. The UPS 100 is based on a delta conversion topology. For example, according to one embodiment, the UPS 100 utilizes some aspects of a delta conversion topology as implemented in the Symmetra® MW model of UPS's sold by Schneider Electric IT Corporation of West Kingston, Rhode Island; however, in other embodiments, other types of delta conversion topologies may be utilized. The UPS 100 includes an AC mains input 102, a mains switch 104, a first transformer 106, a second transformer 108, and AC output 110, a delta inverter 112, a main inverter 114, a DC bus 116, a first battery 120, a second battery 122, a DC output 118, and a controller 126.

The AC mains input 102 is coupled to a first end of a primary winding 105 of the first transformer 106 via the mains switch 104. The other end of the primary winding 105 is coupled to the AC output 110. The secondary winding 107 of the primary transformer 106 is coupled to an AC interface 113 of the delta inverter 112. A primary winding 109 of the second transformer 108 is coupled between the AC output 110 and ground 123. A secondary winding 111 of the second transformer is coupled to an AC interface 117 of the main inverter 114. A DC interface 115 of the delta inverter 112 and a DC interface 119 of the main inverter 114 are both coupled to the DC output 118 via the DC bus 116. The first battery 120 and the second battery 122 are coupled in series between the DC bus 116 and ground 124. The controller 126 is coupled to the DC bus 116, the delta inverter 112 and the main inverter 114. The AC output 110 is configured to be coupled to external AC loads. The DC output 118 is configured to be coupled to external DC loads.

The delta inverter 112 and the main inverter 114 are bidirectional devices (i.e., each is capable of converting power from AC to DC and from DC to AC). In an online mode of operation, once the mains switch 104 is closed, mains input AC power (e.g., from an AC utility source coupled to the AC mains input 102) is provided to the primary winding 105 of the first transformer. DC power from the batteries 120, 122 is provided to the DC interface 115 of the delta inverter 112. The delta inverter 112 converts the DC power from the batteries 120, 122 into AC power and provides the AC power to the secondary winding 102 of the first transformer 106.

The delta inverter 112 is operated by the controller 126 to act as a current source and regulate the current in the secondary winding 107 of the first transformer 106. By regulating the current in the secondary winding 107 of the first transformer 106, the delta inverter 112 also controls the current through the primary winding 105 of the first transformer 106 (i.e., the input current of the UPS 100). The current through the primary winding 105 of the first transformer 102 (regulated by the delta inverter 112) is provided to external AC loads coupled to the AC output 110.

According to one embodiment, the controller 126 is configured to operate the delta inverter 112 to provide power factor correction. For example, in one embodiment, the controller 126 is configured to operate the delta inverter 112 to draw only sinusoidal input current (from the AC utility) that is substantially in phase with AC voltage provided to the AC input 102 by the AC utility. This may ensure that power is drawn from the AC utility with a unity power factor.

Figure 2:
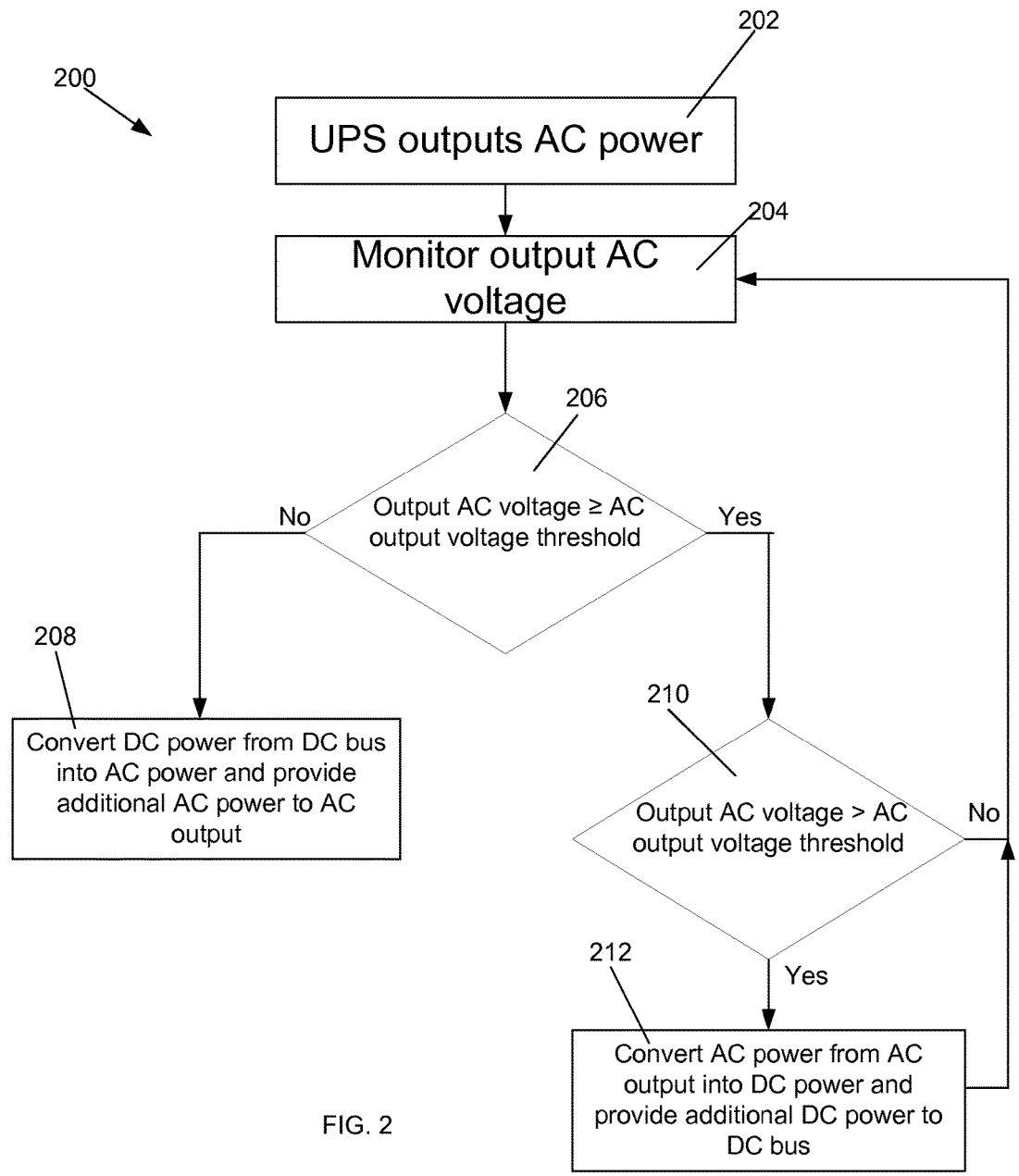
FIG. 2 is a flow chart of a process for operating a main inverter in accordance with aspects of the present invention.

Operation of the UPS 100 is discussed in greater detail below with regard to FIGS. 2 and 3. FIG. 2 is a flow chart 200 of a process for operating the main inverter 114 according to at least one embodiment described herein. The controller 126 operates the main inverter 114 to maintain AC output voltage of the UPS 100 at a level sufficient to power AC loads coupled to the AC output 110.

In the online mode of operation, at block 202, AC power from the primary winding 105 of the first transformer 106 is provided to the AC output 110. At block 204, as AC power from the primary winding 105 of the first transformer 106 is provided to the AC output 110, the controller 126, via the main inverter 114 and the second transformer 108, monitors the AC voltage of the AC power at the AC output 110. Based on the monitored AC voltage at the AC output 110, the controller 126 operates the main inverter 114 to act as a voltage source and maintain a relatively constant AC voltage at the AC output 110. For example, at block 206, the controller 126 determines if the AC voltage at the AC output 110 is at least at an AC output voltage threshold level (i.e., a level sufficient to adequately support AC loads coupled to the AC output 110).

At block 208, if the controller 126 determines that the AC voltage at the AC output 110 is low (i.e., is below the AC output voltage threshold level), the controller 126 operates the main inverter 114 to convert DC power from the DC bus 116, received at the DC interface 119, into AC power and provide the converted AC power, via the AC interface 117 and the second transformer 108, to the AC output 110 to increase the AC voltage at the AC output 110.

At block 210, in response to a determination by the controller 126 that the AC voltage at the AC output 110 is at least at the AC output voltage threshold level, another determination is made by the controller 126 whether the AC voltage at the AC output 110 is greater than the AC output voltage threshold level. In response to a determination by the controller 126 that the AC voltage at the AC output 110 is at the AC output voltage threshold level, at block 204 the controller 126 continues to monitor the AC voltage at the AC output 110.

At block 212, in response to a determination by the controller 126 that the AC voltage at the AC output 110 is high (i.e., greater than the AC output voltage threshold level), the controller 126 operates the main inverter 114 to convert AC power from the AC output 110, received at the AC interface 117 via the second transformer 108, into DC power (consequently decreasing the AC voltage at the AC output 110) and provide the converted DC power, via the DC interface 119, to the DC bus 116. The DC power on the DC bus 116 charges or maintains the batteries 120, 122 and/or is provided to DC loads coupled to the DC output 118. At block 204 the controller 126 continues to monitor the AC voltage at the AC output 110.

Figure 3:
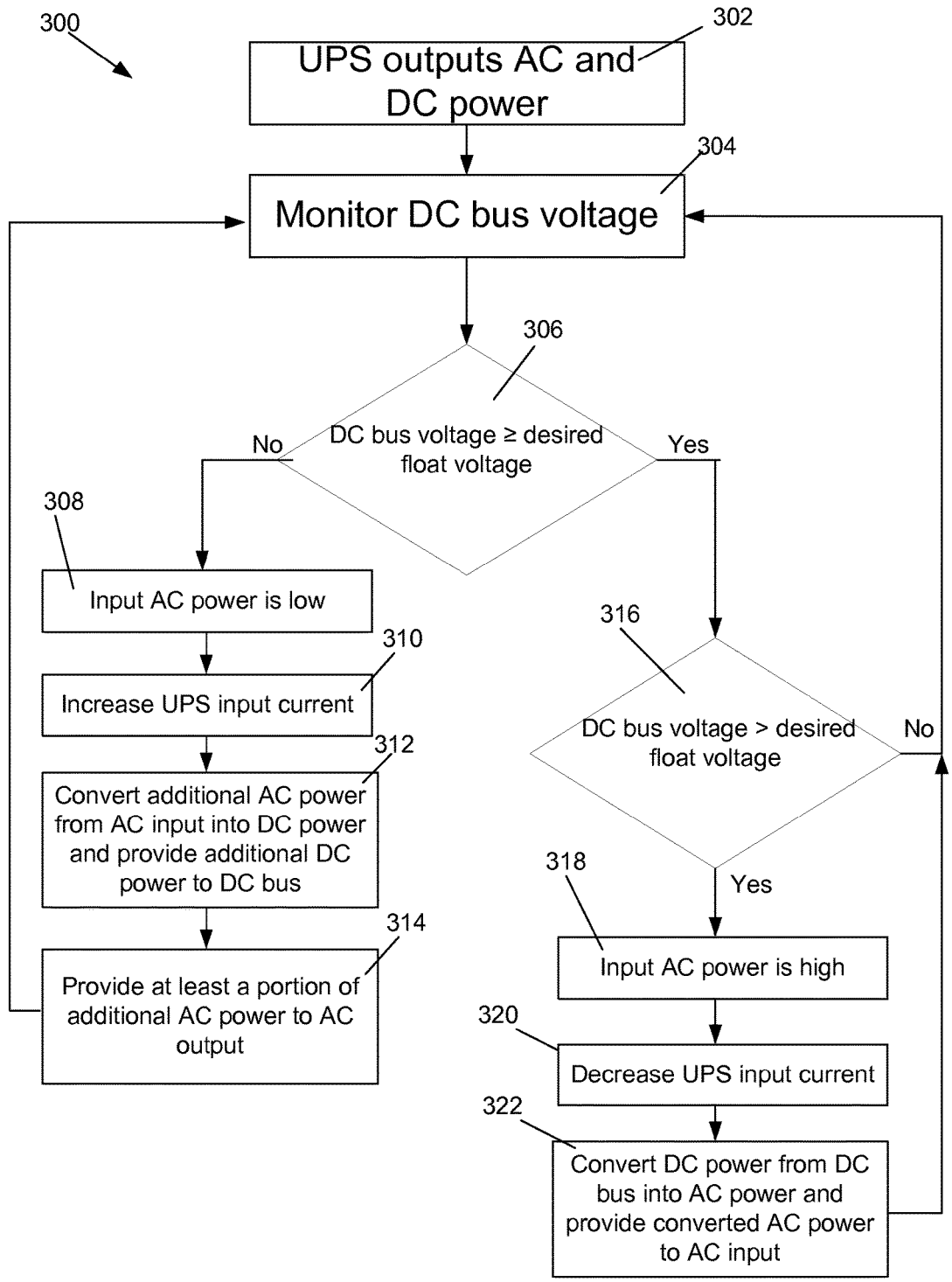
FIG. 3 is a flow chart of a process for operating a delta inverter in accordance with aspects of the present invention.

FIG. 3 is a flow chart 300 of a process for operating the delta inverter 112 according to at least one embodiment described herein. The controller 126 operates the delta inverter 112 to maintain DC output voltage of the UPS 100 at a level sufficient to power DC loads coupled to the DC output 110.

In the online mode of operation, at block 302, the UPS 100 provides AC power to AC loads coupled to the AC output 110 and DC power to DC loads coupled to the DC output 118. As AC power is provided to the AC loads and DC power is provided to the DC loads, the controller 126 is configured to control the delta inverter 112 to regulate the input current of the UPS 100 (by regulating the current in the secondary winding 107 of the first transformer as discussed above) so that there is sufficient power available from the UPS 100 to power both the AC loads coupled to the AC output 110 and the DC loads coupled to the DC output 118.

According to one embodiment, a regulation loop including the DC bus 116, the controller 126, and the delta inverter 112 is utilized to maintain a desired float voltage on the DC bus 116. The controller 126 monitors the DC voltage on the DC bus, and based on the sensed DC voltage, regulates the amplitude of the input current of the UPS 100 to ensure that the UPS 100 is drawing enough power from AC mains to cover the sum of power drawn by the UPS 100 (including power drawn by the AC loads coupled to the AC output 110, power drawn by the DC loads coupled to the DC output 118, power required to recharge or maintain the batteries 120, 122, and power to cover any UPS losses).

For example, at block 304, the controller 126 monitors the level of the DC voltage on the DC bus 116. At block 306, the controller 126 determines if the DC bus voltage is at least at a desired float voltage level (i.e., a threshold level sufficient to power DC loads coupled to the DC output 118 and charge or maintain the batteries 120, 122). At block 308, in response to a determination by the controller 126 that the DC bus voltage is low (i.e., below the desired float voltage level) the controller 126 recognizes that insufficient AC power is being drawn from AC mains to adequately cover the sum of power drawn by the AC loads, DC loads and the batteries 120, 122.

The presence of a low DC voltage on the DC bus may result from multiple different conditions within the UPS 100. For example, in one embodiment, where the AC power provided to the AC output 110 (being regulated by the main inverter 114) is adequate to power the AC loads, excess DC power provided by the main inverter 114 to the DC bus 116 may be inadequate to power the DC loads coupled to the DC output 118 and to charge or maintain the batteries 120, 122, resulting in the low voltage on the DC bus. In another embodiment, where AC power provided to the AC output 110 via the primary winding 105 of the first transformer is inadequate, additional power may be pulled from the DC bus 116 by the main inverter 114 and provided to the AC output 110, resulting in the reduced voltage on the DC bus. In another embodiment, the AC mains power being drawn by the UPS 100 may be insufficient to meet the total power needs of the UPS 100, resulting in the reduced voltage on the DC bus.

Upon sensing a low DC voltage level on the DC bus 116, the controller 126 operates the delta inverter 112 to regulate the amplitude of the input current of the UPS 100 to resolve the power deficiency within the UPS 100 indicated by the low DC voltage level on the DC bus 116. For example, at block 310, in response to sensing a low DC voltage level on the DC bus 116, the controller 126 operates the delta inverter 112 to increase the input current of the UPS 100. According to one embodiment, at block 312, at least a portion of the additional AC power generated by the increase in input current is received by the AC interface 113 of the delta inverter 112 via the first transformer 106, converted by the delta inverter 112 into DC power and provided, via the DC interface 115, to the DC bus 116 to increase the DC voltage level (and consequently DC power available) on the DC bus. According to one embodiment, at block 314, at least a portion of the additional AC power generated by the increase in input current may be provided to the AC output 110 to increase the AC power at the AC output 110. The increased AC power at the AC output 100 is regulated by the main inverter 114 (as discussed above with regard to FIG. 2) and may be provided to AC loads coupled to the AC output 110 and/or converted to DC power and provided to the DC bus 116 if excess power is available at the AC output 110.

At block 304, the controller 126 continues to monitor the DC bus voltage level. According to one embodiment, once the controller 126 senses that the DC voltage level on the DC bus 116 is no longer low (i.e., at least at the desired float voltage level), the controller 126 operates the delta inverter 112 to stop pulling AC power from the input 102, via the first transformer 106 (and converting it into DC power), and to regulate the input current of the UPS so that the AC power provided to the primary winding 105 of the first transformer 106 by AC mains is adequate to cover the power needs of the UPS 100.

At block 316, in response to a determination by the controller 126 that the DC bus voltage is at least at the desired float voltage level, another determination is made by the controller 126 whether the DC bus voltage is greater than the desired float voltage level. In response to a determination by the controller 126 that the DC bus voltage is at the desired float voltage level, at block 304 the controller 126 continues to monitor the DC voltage on the DC bus 116.

At block 318, in response to a determination by the controller 126 that the DC bus voltage is high (i.e., greater than the desired float voltage level), the controller 126 recognizes that too much AC power is being drawn from AC mains. The presence of a high DC voltage on the DC bus (indicating an overdraw of input current by the UPS 100) may result from multiple different conditions within the UPS 100.

For example, in one embodiment, where the AC power provided to the AC output 110 (being regulated by the main inverter 114) is adequate to power the AC loads currently coupled to the AC output 110, the excess DC power provided by the main inverter 114 to the DC bus 116 and/or the DC power provided by the delta inverter 112 to the DC bus 116 may be more than is required to power the DC loads currently coupled to the DC output 118 and to charge or maintain the batteries 120, 122, resulting in the high voltage on the DC bus.

Upon sensing a high DC voltage level on the DC bus 116, the controller 126 operates the delta inverter 112 to regulate the amplitude of the input current of the UPS 100 to resolve the excess power being drawn by the UPS 100, indicated by the high DC voltage level on the DC bus 116. For example, according to one embodiment, at block 320, in response to sensing a high DC voltage level on the DC bus 116, the controller 126 operates the delta inverter 112 to decrease the input current of the UPS 100. At block 322, the controller 126 also operates the delta inverter 112 to convert DC power received from the DC bus 116 via the DC interface 115 into AC power to reduce the DC voltage level on the DC bus 116, and provide the converted AC power to the input 102, via the first transformer 106. The controller 126 operates the delta inverter 112 to regulate the input current of the UPS and to provide AC power to the first transformer 106 such that the sum of AC power received at the AC input 102 from AC mains and the delta inverter 113 is adequate to cover the power needs of the UPS 100 but also so that the DC voltage level on the DC bus 116 is reduced.

At block 304, the controller 126 continues to monitor the DC bus voltage level. According to one embodiment, once the controller 126 senses that the DC voltage level on the DC bus 116 is no longer high, the controller 126 operates the delta inverter 112 to stop pulling DC power from the DC bus (and converting it into AC power) and to regulate the input current of the UPS so that the AC power provided to the primary winding 105 of the first transformer 106 by AC mains is adequate to cover the power needs of the UPS 100.

In a backup mode of operation of the UPS 100 (e.g., where the AC mains coupled to the AC input 102 fails), DC power from the batteries 120, 122 is provided to the DC loads coupled to the DC output 118 via the DC bus 116. The DC power on the DC bus 116 is also received by the main inverter 114 via the DC interface 119, converted to AC power, and provided to the AC loads coupled to the AC output 110 via the second transformer 108.

By maintaining a desired float voltage on the DC bus 116 in the online mode of operation, the control loop of the controller 126, DC bus 116 and delta inverter 112 is able to ensure that adequate power is available to be provided by the single UPS 100 to both AC loads and DC loads in a datacenter. The UPS 100 is also flexible in that it may be adapted to provide AC power to any number of AC loads coupled to the AC output and DC power to any number of DC loads coupled to the DC output. The UPS 100 supports the AC loads by controlling the main inverter 114 to maintain a constant AC voltage at the AC output 110 capable of supporting the AC loads currently coupled to the AC output 110. The UPS 100 supports the DC loads by maintaining a desired float voltage on the DC bus which is capable of supporting the DC loads currently coupled to the DC output 118.

According to one embodiment, the first 106 and second transformers 108 provide galvanic isolation between the DC output 118 and the AC output 110 (and also between the AC input 102 and the batteries 120, 122). According to at least one embodiment, the galvanic isolation provided by the transformers 106, 108 may enhance the safety of the UPS 100. For example, absent the galvanic isolation, when DC power is being provided to DC loads coupled to the DC output 118 and AC power is being provided to AC loads coupled to the AC output 110, safety critical arc flash scenarios may arise if any ground faults in the DC bus 116, DC output 118, or DC loads occur. The galvanic isolation provided by the transformers 106, 108 may prevent such arc flashes.

According to one embodiment, the isolation between the AC output 110 and the DC output 118 provided by the transformers 106, 108 may allow for wide flexibility in the configuration of the AC voltage at the AC output 110 and the DC voltage at the DC output 118. For example, according to one embodiment, the AC voltage at the AC output 110 (regulated by the main inverter 114) may be defined as any AC voltage (e.g., 3×480 V AC). Due to the isolation between the AC output 110 and the DC output provided by the transformers 106, 108, the DC voltage on the DC output 118 is fully floating and is isolated from the AC voltage of the AC output. Accordingly, the floating DC voltage on the DC bus 116 may be defined as any desired DC voltage depending on the requirements of the DC loads coupled to the DC output 118 and is not restricted by the AC voltage at the AC output 110.

For example, according to one embodiment and as illustrated in FIG. 1, where the batteries 120, 122 are coupled in series (with the negative terminal 130 of the battery 122 coupled to ground 124 and the positive terminal 132 of the battery 120 coupled to the DC bus 116) to provide a positive DC voltage to the DC bus 116, the floating DC voltage may be defined as a positive floating DC voltage (e.g., +380 V DC). According to another embodiment, where the batteries 120, 122 are coupled in series (with the positive terminal 134 of the battery 122 coupled to ground 124 and the negative terminal 136 of the battery 116 coupled to the DC bus 116) to provide a negative DC voltage to the DC bus 116, the floating DC voltage may be defined as a negative floating DC voltage (e.g., −380 V DC). According to another embodiment, where the DC bus 116 is coupled at a point 128 between the batteries 120, 122 (with the negative terminal 136 of the battery 120 being coupled to the DC bus 116 and the positive terminal 134 of the battery 122 being coupled to the DC bus 116), the floating DC voltage on the DC bus 116 may be defined as any other DC value generated by the sum of the negative voltage from the battery 120 and the positive voltage from the battery 122.

By isolating the AC output 110 from the DC output 118, the UPS 100 is able to generate any desired floating DC voltage on the DC bus 116 to be provided to DC loads coupled to the DC output 118. This may allow the UPS 100 to be flexible and adapt to different DC voltage levels required by DC loads coupled to the UPS 100.

As described above, the UPS includes two batteries; however, in other embodiments, the UPS may include any number of batteries.

As also described above, the UPS includes a single controller to operate the UPS; however, in other embodiments, more than one controller may be included within the UPS to control the operation of the UPS.

Embodiments described herein provide a UPS with both AC and DC outputs that is capable of providing power to both AC and DC powered loads. By providing a single UPS with both AC and DC outputs, the complexity of UPS systems within a datacenter may be reduced and the single UPS may be adapted to meet different AC and DC load requirements of the datacenter. Additionally, according to some embodiments, the UPS described herein may be relatively efficient, able to provide isolation between AC and DC loads, and provide Power Factor Correction (PFC) functionality for both AC and DC loads.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An Uninterruptible Power Supply (UPS) comprising:
   an input configured to be coupled to an AC source and to receive input AC power from the AC source;
   a DC bus configured to be coupled to a DC source and to receive backup DC power from the DC source;
   a first output configured to be coupled to at least one AC load and to provide output AC power having an output AC voltage to the at least one AC load derived from at least one of the input AC power and the backup DC power;
   a second output configured to be coupled to at least one DC load and to provide output DC power having an output DC voltage to the at least one DC load derived from at least one of the input AC power and the backup DC power;
a first transformer having a first end of a primary winding coupled to the input, a second end of the primary winding coupled to the first output, and a secondary winding, the first transformer configured to provide at least a portion of the output AC power from the primary winding to the first output and to provide isolation between the input and the DC source;
a first bidirectional converter coupled between the DC bus and the first transformer, wherein the secondary winding of the first transformer is coupled between the primary winding and the first bidirectional converter;
a second bidirectional converter coupled between the DC bus and a second transformer, the second transformer coupled to the first output and configured to provide isolation between the first output and the second output; and
a controller configured to operate the second bidirectional converter to maintain the output AC voltage above a first threshold value and to operate the first bidirectional converter to maintain the output DC voltage above a second threshold.

2. The UPS of claim 1, wherein the controller is further configured to monitor a voltage level of the DC bus and, based on the voltage level of the DC bus, to operate the first bidirectional converter to adjust the input AC power by regulating current in the secondary winding of the first transformer.

3. The UPS of claim 2, wherein the controller is further configured to determine whether the voltage level of the DC bus is at a desired float level, and in response to a determination that the voltage level of the DC bus is less than the desired float level, to operate the first bidirectional converter to increase the input AC power, convert at least a portion of the increased input AC power, from the first transformer, into DC power, and provide the converted DC power from the first bidirectional converter to the DC bus.

4. The UPS of claim 3, wherein the controller is further configured to operate the second bidirectional converter to convert at least a portion of the increased input AC power, from the second transformer, into DC power and provide the converted DC power from the second bidirectional converter to the DC bus.

5. The UPS of claim 3, wherein the controller is further configured, in response to a determination that the voltage level of the DC bus is greater than the desired float level, to operate the first bidirectional converter to decrease the input AC power, convert DC power from the DC bus into AC power, and provide the converted AC power from the first bidirectional converter to the input via the first transformer.

6. The UPS of claim 3, further comprising the DC source and wherein the DC source includes a plurality of batteries coupled in series and configured to provide a positive voltage to the DC bus.

7. The UPS of claim 3, further comprising the DC source and wherein the DC source includes a plurality of batteries coupled in series and configured to provide a voltage to the DC bus.

8. The UPS of claim 1, wherein a primary winding of the second transformer is coupled between the first output and ground, and wherein a secondary winding of the second transformer is coupled to the second bidirectional converter.

9. The UPS of claim 8, wherein the controller is further configured to monitor the output AC voltage and, in response to a determination that the output AC voltage is less than the first threshold value, to operate the second bidirectional converter to convert DC power from the DC bus into AC power and provide the converted AC power from the second bidirectional converter to the first output via the second transformer.

10. The UPS of claim 8, wherein the controller is further configured, in response to a determination that the output AC voltage is greater than the first threshold value, to operate the second bidirectional converter to convert a portion of the output AC power, from the second transformer, into DC power and provide the converted DC power from the second bidirectional converter to the DC bus.

11. A method for operating an Uninterruptible Power Supply (UPS) having an input to receive input AC power, a DC bus configured to receive backup DC power, a first output configured to be coupled to at least one AC load and to provide output AC power having an output AC voltage to the at least one AC load derived from at least one of the input AC power and the backup DC power, a second output configured to be coupled to at least one DC load and to provide output DC power having an output DC voltage to the at least one DC load derived from at least one of the input AC power and the backup DC power, and a first transformer having a first end of a primary winding coupled to the input, a second end of the primary winding coupled to the first output, and a secondary winding coupled between the primary winding and a first bidirectional converter, wherein the method comprises:
providing, from the primary winding of the first transformer, at least a portion of the output AC power to the at least one AC load;
monitoring, with a controller, the output DC voltage provided to the at least one DC load;
monitoring, with the controller, the output AC voltage provided to the at least one AC load;
operating the first bidirectional converter coupled between the DC bus and the input to maintain the output DC voltage provided to the at least one DC load above a first threshold; and
operating a second bidirectional converter coupled between the DC bus and the first output to maintain the output AC voltage provided to the at least one AC load above a second threshold; and
providing isolation between the first output and the second output.

12. The method of claim 11, wherein monitoring the output DC voltage includes monitoring a DC voltage level of the DC bus, and wherein operating the first bidirectional converter includes operating, based on the DC voltage level of the DC bus, the first bidirectional converter to adjust the input AC power by regulating current in the secondary winding of the first transformer.

13. The method of claim 12, wherein operating the first bidirectional converter to adjust the input AC power includes:
determining whether the DC voltage level of the DC bus is less than a desired float level;
in response to a determination that the DC voltage level of the DC bus is less than the desired float level, operating the first bidirectional converter to increase the input AC power;
converting at least a portion of the increased input AC power, from the first transformer, into DC power; and
providing the converted DC power from the first bidirectional converter to the DC bus.

14. The method of claim 13, further comprising:
operating the second bidirectional converter to convert at least a portion of the increased input AC power, from the second transformer, into DC power; and
providing the converted DC power from the second bidirectional converter to the DC bus.

15. The method of claim 13, wherein operating the first bidirectional converter to adjust the input AC power further includes:
in response to a determination that the DC voltage level of the DC bus is greater than the desired float level, operating the first bidirectional converter to decrease the input AC power;
converting DC power from the DC bus into AC power; and
providing the converted AC power from the first bidirectional converter to the input via the first transformer.

16. The method of claim 11, wherein the second bidirectional converter is coupled to the first output via a second transformer, the second transformer having a primary winding coupled between the first output and ground and a secondary winding coupled to the second bidirectional converter, and wherein operating the second bidirectional converter includes:
in response to a determination that the output AC voltage is less than the second threshold, operating the second bidirectional converter to convert DC power from the DC bus into AC power; and
providing the converted AC power from the second bidirectional converter to the first output via the second transformer.

17. The method of claim 16, wherein operating the second bidirectional converter further includes:
in response to a determination that the output AC voltage is greater than the second threshold, operating the second bidirectional converter to convert a portion of the output AC power, from the second transformer, into DC power; and
providing the converted DC power from the second bidirectional converter to the DC bus.

18. An Uninterruptible Power Supply (UPS) comprising:
an input configured to be coupled to an AC source and to receive input AC power from the AC source;
a DC bus configured to be coupled to a DC source and to receive backup DC power from the DC source;
a first output configured to be coupled to at least one AC load and to provide output AC power having an output AC voltage to the at least one AC load derived from at least one of the input AC power and the backup DC power;
a second output configured to be coupled to at least one DC load and to provide output DC power having output DC voltage to the at least one DC load derived from at least one of the input AC power and the backup DC power;
a first transformer having a first end of a primary winding coupled to the input, a second end of the primary winding coupled to the first output, and a secondary winding, the first transformer configured to provide at least a portion of the output AC power from the primary winding to the first output;
means for providing galvanic isolation between the first output and the second output;
a first bidirectional conversion means for maintaining the output DC voltage above a first threshold, wherein the secondary winding of the first transformer is coupled between the primary winding and the first bidirectional conversion means; and
a second bidirectional conversion means for maintaining the output AC voltage above a second threshold.

* * * * *